Patented Nov. 8, 1927.

1,648,750

UNITED STATES PATENT OFFICE.

IRVING R. VALENTINE, OF ERIE, PENNSYLVANIA, ASSIGNOR TO GENERAL ELECTRIC COMPANY, A CORPORATION OF NEW YORK.

PROCESS OF TREATING IRON.

No Drawing.    Application filed December 29, 1923.   Serial No. 683,511.

The present invention relates to the treatment of iron which is intended to be malleableized. It is the object of my invention to improve the character of the iron castings in such a way that both the time and the temperature required for malleableizing may be materially reduced. As a further consequence of my invention the product is improved and reduced in cost.

Heretofore it has been customary to prepare castings adapted for malleableizing by melting iron in a cupola, separating the melt into two portions, one of which was blown with air to reduce the carbon content to a low residue and then mixing these two portions and desulphurizing in an electric furnace.

In accordance with my invention, the reduction of carbon content of the product from the cupola is attained by oxidizing the molten metal from the cupola as a whole in the electric furnace prior to the desulphurizing step. In my opinion the improved results are largely due to the greater homogeneity of the product and the degree of completeness with which the reactions proceed.

In carrying out my invention, pig iron, scrap iron or other suitable raw material are melted in a cupola. The composition of the product will vary considerably in accordance with the character of the iron melted but usually the carbon content will be about 3.0 to 3.5% and the sulphur content will be somewhere about .12 to .30%. The molten material from the cupola is transferred in a molten condition to an electric arc furnace, preferably a furnace of the Heroult type. About 50 to 60 pounds of iron ore per ton of metal is added to the molten bath in order to reduce the carbon content. The iron ore should be low in sulphur and phosphorus. A typical suitable analysis of the iron ore useful for this process is as follows, the first column representing percentages:

59.00 iron
.09 phosphorus
5.55 silica, $SiO_2$
.52 manganese
2.51 alumina, $Al_2O_3$
1.80 lime, CaO
1.30 magnesia, MgO
.01 sulphur It is also desirable to blow air through the usual tuyères of refractory material inserted into the bath. This blowing may be continued for 15 to 20 minutes. By the oxidizing action of both the iron ore and the air blast, the carbon is reduced down to about 2.75 to 2.50 or even lower if desired. The silicon and manganese are also incidentally reduced to a very low value, less than .1% respectively. As these elements are desired in malleable iron they must be restored, respectively, by the addition of ferrosilicon, silicon pig iron or silicon metal and ferro-manganese, spiegeleisen or manganese metal. It is desirable to use raw materials which are low in silicon and manganese in order to avoid waste of these elements. Heat preferably is added during this oxidizing step in the electric furnace by the agency of the electric arc. At the end of this oxidizing step the iron is in a highly oxidized condition and lime is thereupon added to the bath to the extent of about 20 pounds per ton in order to desulphurize the same. Preferably some suitable form of carbon such as powdered coal or other ground carbonaceous material is added to the slag in order to maintain the slag chemically reducing in action. Ferro-silicon may be restored in part to the bath at this point. The desulphurizing action is continued for about 30 minutes, the sulphur content thereby being reduced below .05. At the end of the desulphurizing treatment the silicon content is brought up to a final content of about .80 to 1% silicon depending on the castings being made. A slight addition of ferro-manganese may also be made at this point, but the ferro-manganese addition may be but slight as some of the manganese is restored to the bath by reduction during the desulphurizing step. The molten iron is finally tapped into ladles and cast according to the usual foundry practice.

Castings made from iron prepared by the above process may be annealed through the ranges commercially used on malleable iron, when made in the air furnace, the time required for the anneal being about 60 hours as usual. The iron thus made shows a higher tensile strength and elongation than iron of the same content made by the air furnace process. Iron heretofore made by a process involving the oxidation of part of the melt from a cupola with a subsequent mixing of the oxidized iron and the unoxidized iron previous to the desulphurizing step requires a higher annealing temperature during the first period of the anneal than iron prepared in accordance with my invention followed by a drop in temperature during a critical range, and then a prolonged holding at a predetermined temperature in order to produce the desired properties in the annealed product. This prior annealing treatment required approximately double the time required to accomplish the same results in the product made in accordance with my invention.

What I claim as new and desire to secure by Letters Patent of the United States, is:—

1. The method of treating iron which is adapted to be malleableized, which comprises melting iron in a cupola, oxidizing the molten product in an electric furnace to reduce the carbon content, thereafter desulphurizing the charge and finally adding silicon preparatory to casting.

2. The method of treating iron melted in a cupola and having a high carbon content which consists in introducing said metal into an electric furnace, oxidizing the metal until the carbon content has been lowered to a value desired for malleable iron, desulphurizing and alloying with metals desired in the product.

3. The method of making malleable iron from iron having a carbon content of about 3.0 to 3.5 per cent which consists in oxidizing said iron in a molten state in a closed container until the carbon content has been reduced to about 2.75 to 2.50 per cent, thereupon treating the product with a reducing agent in the presence of a lime slag until the sulphur content is reduced to a negligible value, adding silicon in sufficient amounts to bring the silicon content to about 0.8 to 1.0 per cent, casting the metal and annealing said castings.

4. The method of treating iron high in carbon and sulphur to render castings therefrom capable of being malleableized, which consists in charging said product into an electric arc furnace, heating the product by an electric arc, oxidizing the product by the addition of iron oxide and blowing with air to reduce the carbon content to about 2.50 per cent, adding a basic reducing slag and desulphurizing the charge.

In witness whereof, I have hereunto set my hand this 26th day of December, 1923.

IRVING R. VALENTINE.